United States Patent [19]

Johnson et al.

[11] Patent Number: 4,539,182

[45] Date of Patent: Sep. 3, 1985

[54] AUTOMATED REAGENT BLOTTER

[75] Inventors: Leighton C. Johnson, Edwardsburg, Mich.; James S. King, Jr., Goshen, Ind.

[73] Assignee: Miles Laboratories, Inc., Elkhart, Ind.

[21] Appl. No.: 483,179

[22] Filed: Apr. 8, 1983

[51] Int. Cl.[3] ............................................ G01N 35/00

[52] U.S. Cl. .................................. 422/99; 73/864.72; 422/58; 422/63; 436/44; 436/164; 435/287

[58] Field of Search ...................... 422/99, 100, 56–58, 422/63; 436/44, 49, 164; 435/287, 292; 73/864.72

[56] References Cited

U.S. PATENT DOCUMENTS 3,358,496 12/1967 Farmer ............................ 73/864.72
4,233,029 11/1980 Columbus .......................... 422/100
4,351,800 9/1982 Kopp et al. .......................... 422/70

FOREIGN PATENT DOCUMENTS 1180166 10/1964 Fed. Rep. of Germany ... 73/864.72

*Primary Examiner*—Arnold Turk
*Assistant Examiner*—Joseph P. Carrier
*Attorney, Agent, or Firm*—Roger N. Coe

[57] ABSTRACT

Apparatus is disclosed for aligning and simultaneously removing excess fluid from test devices. The apparatus comprises carrier means designed to support a test device used for the determination of constituents in fluid. The apparatus further comprises blotter means supported and guided by the carrier means, said blotter means being capable of moving along the carrier means and contacting the test device along one of the blotter surfaces. The surface of the blotter means which contacts the test device has characteristics to facilitate the removal of excess fluid present on the test device upon contact of the blotter with the test device.

6 Claims, 3 Drawing Figures

AUTOMATED REAGENT BLOTTER

FIELD OF THE INVENTION

The present invention relates to device for orientating and removing excess fluid from test devices and, more particularly, an automated reagent blotter for use in orientating and removing excess fluid from test devices which are capable of determining the presence and/or the amount of a constituent present in a test sample.

BACKGROUND OF THE INVENTION

The art of analytical chemistry has been greatly advanced since biochemistry began emerging as a primary scientific frontier, requiring increasingly sophisticated analytical methods and tools to solve problems. Likewise the medical profession has lent impetus to the growth of analytical chemistry, with its desiderata of both high precision and speed in obtaining results.

To satisfy the needs of the medical profession as well as other expanding technologies, such as the brewing industry, chemical manufacturing, etc., a myriad of analytical procedures, compositions and apparatus have evolved, including the so called "dip- and-read" type reagent test devices. Reagent strip test devices enjoy wide use in many analytical applications, especially in the chemical analysis of biological fluids, because of their relatively low cost, ease of usability, and speed in obtaining results. In medicine, for example, numerous physiological functions can be monitored merely by dipping a reagent strip test device into a sample of body fluid, such as urine or blood, and observing a detectable response, such as a change in color or a change in the amount of light reflected from or absorbed by the test device.

Many of the "dip-and-read" test devices for detecting body fluid components are capable of making quantitative or at least semiquantitative measurements. Thus, by measuring the response after a predetermined time, an analyst can obtain not only a positive indication of the presence of a particular constituent in a test sample, but also an estimate of how much of the constitutent is present. Such test devices provide the physician with a facile diagnostic tool as well as the ability to gage the extent of disease or of bodily malfunction.

Illustrative of such test devices currently in use are products available from the Ames Division of Miles Laboratories, Inc. under the trademarks CLINISTIX, MULTISTIX, KETOSTIX, N-MULTISTIX, DIASTIX, DEXTROSTIX, and others. Test devices such as these usually comprise one or more carrier matrixes, such as absorbent paper, having incorporated therein a particular reagent or reactant system which manifests a detectable response, e.g., a color change in the presence of a specific test sample component or constituent. Depending on the reactant system incorporated with a particular matrix, these test devices can detect the presence of glucose, ketone bodies, bilirubin, urobilinogen, occult blood, nitrite, and other substances. A specific change in the intensity of color observed within a specific time range after contacting the test device with a sample is indicative of the presence of a particular constituent and/or its concentration in the sample. Some of these test devices and their reagent systems are set forth in U.S. Pat. Nos. 3,123,443; 3,212,855; 3,814,668; etc.

Regardless of whether the test device is used for the determination of a biological fluid or the analysis of a commercial or industrial fluid, the normal procedure requires that the test device be blotted after contacting the sample or specimen to be tested in order to remove excess fluid from the test device matrix prior to visual or instrumental analysis. The blotting procedure must be done extremely carefully to avoid interference with the reaction occuring in the test device matrix. Ideally, the blotting procedure is performed uniformly each time a test device is used in order to achieve consistent results. The blotting procedure becomes very critical when instruments such as reflectance photometers are used to determine a detectable response. Current analyzers require that inoculated test devices be manually blotted prior to their insertion into such analyzers. In accordance with the present invention, manual blotting is eliminated and a test device can simply be inoculated and presented for analysis.

SUMMARY OF THE INVENTION

An object of the present invention is to provide an automated reagent blotter capable of aligning a test device while simultaneously removing excess fluid from the test device.

Another object of the present invention is to provide an automated reagent blotter capable of uniformly removing excess fluid from a test device.

Still another object of the present invention is to improve the speed of automated instruments designed to analyze dip-and-read type test devices.

In accordance with the present invention, an automated reagent blotter is provided for controllably removing excess fluid from a test device. Simultaneously, the reagent blotter serves to orientate the test device. The automated reagent blotter comprises support guide means, i.e. carrier means, which serve as a support for the test device and also as a guide and- support for the blotter. As the blotter abuts and moves the test device along the carrier means alignment of the test device against the contact surface of the blotter is accomplished. Preferably, the contact surface is grooved to provide a series of parallel capillary grooves or channels perpendicular to the plane of the test device. These capillary channels facilitate the removal of excess fluid from the test device and effectively "drain" excess fluid in a reproducible manner from each test device. In an especially preferred embodiment, the length of the capillary channels can be varied for selectively removing fluid from various areas of the test device at different rates and hence achieve various degrees of wetness.

BRIEF DESCRIPTION OF THE DRAWINGS

Other and further objects, advantages and features of the invention will be apparent to those skilled in the art from the following detailed description thereof, taken in conjunction with the accompanying drawings, in which.

DESCRIPTION OF THE PREFERRED EMBODIMENTS

Apparatus forming the subject matter of the present invention is characterized by carrier means designed to support a test device while also guiding and supporting a reagent blotter as the reagent blotter moves along the carrier means.

Figure 1:
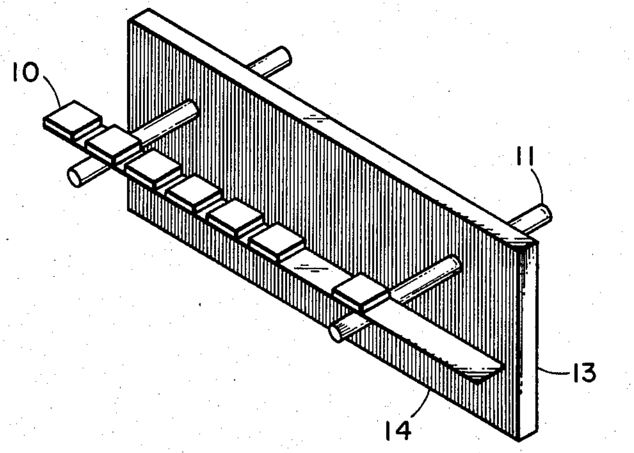
FIG. 1 is a perspective view of an automated reagent blotter in accordance with the present invention showing an inoculated test device positioned on support guide members and a blotter which is capable of moving along the support guide members.
Figure 2:
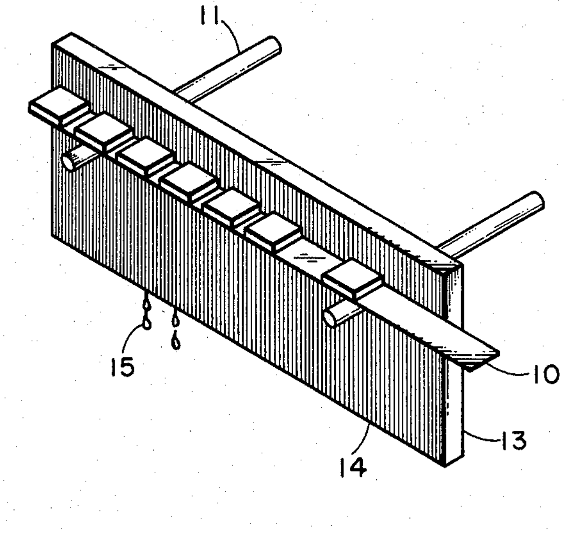
FIG. 2 is a perspective view of the apparatus present in FIG. 1 after the blotter has contacted the inoculated test device.

The automated reagent blotter of the present invention and its operation are illustrated in FIGS. 1 and 2. Specifically, test device 10, which has been dipped into a test solution, rests on carrier means 11 which are shown as rods. The blotter 13, which is supported by and guided by carrier means 11, has a surface 14 which faces the test device 10. Blotter 13 is capable of moving along the carrier means 11 in the direction of test device 10 to make contact between blotter 13 and test device 10 (as shown in FIG. 2).

Test device 10 becomes aligned with blotter 13 as blotter 13 continues to move along carrier means 11. Simultaneously with the contact of the test device 10 against blotter 13, excess fluid present on test device 10 is removed via the surface 14 on blotter 13 and excess fluid flows from blotter 13 in drops 15.

Figure 3:
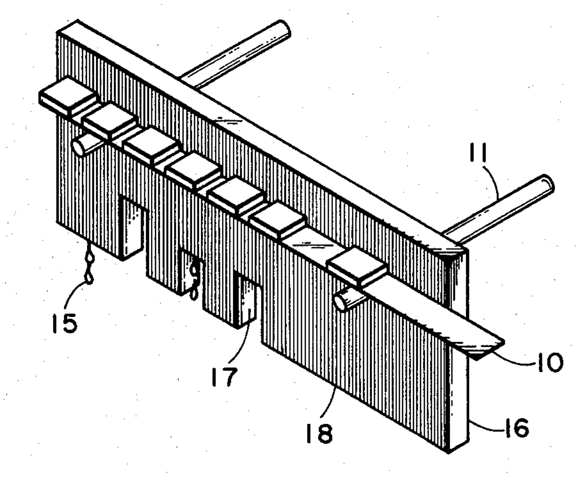
FIG. 3 is a perspective view of apparatus in accordance with a preferred embodiment of the present invention illustrating the use of a blotter having various lengths of capillary grooves.

In a preferred embodiment, the amount of fluid removed from test device can be selectively regulated by designing the blotter in the manner illustrated in FIG. 3. Blotter 16 in FIG. 3 has channels 17 which regulate the amount of liquid removed from various portions of test device 10. Accordingly, it is possible in connection with a test device containing multiple reagent areas to selectively regulate the amount of fluid removed from each reagent area by regulating the length of the capillary grooves present on the surface 18.

The contact surface of the blotter of the present invention can be made of any suitable metallic, fabric or plastic material. Common polymeric materials which can be used include polymers (homopolymers and copolymers) of materials such as vinyl acetate, methylmethacrylate, ethylene, styrene, vinyl alcohol, vinyl chloride, vinylidene chloride, ethylene terephthalate, hexamethylene adipamide-adipic acid, acrylonitrile, ethylene diisocyanate-ethylene glycol, etc. Preferred materials for the contact surface are anodized aluminum, nylon 66, polystyrene, polyethylene terephthalate, phenol-formaldehyde resins, blotting paper and the like. The blotter preferably has capillary grooves cut along one face of the blotter to facilitate the removal of excess fluid when the fluid bridges over and wets the capillary grooves. Gravity causes excess liquid to flow downward until the excess fluid collects as adhering droplets which eventually drop off of the reagent blotter. The blotter can be constructed to have a multilayered format in which different materials are employed for the contact surface and the remainder of the blotter. Thus, for example, the blotter can combine a permanent substrate with a replaceable surface especially designed to control the removal of excess fluid.

In actual use it is sometimes desirable to initially wet the blotter prior to contact with a test device. This procedure also tends to facilitate removal of excess fluid.

It will be understood that although the carrier means 11 are illustrated as rods in the accompanying drawings, these carrier means can have any suitable configuration. The material employed for the carrier means is not critical and any suitable material, such as plastic or metal, can be employed.

It will be understood that any suitable means for moving the blotter along the carrier means can be used.

From the foregoing, it will be seen that this invention is well adapted to attain all of the ends and objects hereinabove set forth, together with other advantages which are obvious and which are inherent to the system. The apparatus of the present invention has the advantages of convenience, simplicity, relatively inexpensiveness, positiveness, effectiveness, durability, accuracy and directness of action. The invention substantially overcomes problems associated with alignment of test devices and instruments and also with nonuniform removal of reagent fluid from test devices. While the apparatus of the present invention is particularly adaptable for use in connection with automated or semiautomated reflectance photometers, the apparatus can be employed in connection with any apparatus designed for transporting, aligning and/or analyzing test devices. The resulting blotting procedure minimizes sample cross contamination and facilitates an increased rate of instrumental analysis of test devices since blotting is automatically effected as part of the overall operation. Thus, the present invention effectively automates the blotting operation and removes this task from the operator of test equipment. The result is a blotting operation which achieves a controlled and predictable amount of liquid removal as required by subsequent instrumentation, e.g., the optical read areas of a photometer.

Obviously, many other modifications and variations of the invention as hereinbefore set forth can be made without departing from the spirit and scope thereof.

What is claimed is:

1. Automated reagent blotter for removing excess fluid from a test device during the orientation of the test device, said automated reagent blotter consisting of:

blotter means comprising a single plate having a contact surface for contacting a dip-and-read test device and removing excess fluid from said dip-and-read test device while orientating the dip-and-read test device, in which the contact surface of the blotter means has a series of capillary grooves perpendicular to the plane of the test device which cause excess fluid to flow from the dip-and-read test device down the capillary grooves upon contact between the blotter means the dip-and-read test device and in which the length of the capillary grooves of said blotter means differ in order to vary the amount of fluid removed from different areasof the dip-and-read test device; and support means which support a dip-and-read test device and guide and support said blotter means as the blotter means contacts the dip-and-read device.

2. The automated blotter of claim 1 in which the support means comprise multiple rods which extend penpendicular to the plane of the blotter means.

3. The combination of a dip-and-read test device and a reagent blotter for removing excess fluid from said test device, comprising:

a dip-and-read test device;

blotter means comprising a single plate having a contact surface for contacting said dip-and-read test device and removing excess fluid from said dip-and-read test device, in which the contact surface of the blotter means has a series of capillary grooves perpendicular to the plane of the test device which causes excess fluid to flow from the dip-and-read test device down the capillary grooves upon contact between the blotter means and the dip-and-read test device and in which the length of the capillary grooves of said blotter means differ in order to vary the amount of fluid removed from different areas of the dip-and-read test device; and support means which support said dip-and-read test device and guide and support said blotter means as the blotter means contacts the dip-and-read test device.

4. The blotter means of claim 1 in which the contact surface of the blotter is aluminum.

5. The blotter means of claim 1 in which the contact surface of the blotter is polystyrene.

6. The blotter means of claim 1 in which the contact surface of the blotter is nylon.

* * * * *